United States Patent [19]

Schweizer

[11] 4,039,931
[45] Aug. 2, 1977

[54] SYSTEM TO SENSE A MARKER ON A ROTATING BODY

[75] Inventor: Hartmut Schweizer, Korntal-Munchingen, Germany

[73] Assignee: Robert Bosch G.m.b.H., Stuttgart, Germany

[21] Appl. No.: 702,958

[22] Filed: July 6, 1976

[30] Foreign Application Priority Data

July 15, 1975 Germany .................... 2531517

[51] Int. Cl.² ............................ F02P 17/00
[52] U.S. Cl. ................................. 324/16 T
[58] Field of Search ............ 324/16 T, 15, 34 PS, 324/34 D; 73/116, 117.3, 118

[56] References Cited

U.S. PATENT DOCUMENTS

| 2,785,215 | 3/1957 | Yetter | 324/16 T |
|---|---|---|---|
| 3,030,813 | 4/1962 | Crawford et al. | 324/16 T |
| 3,292,092 | 12/1966 | Germann | 324/15 X |
| 3,650,149 | 3/1972 | Howes | 324/16 T X |
| 3,727,124 | 4/1973 | Kahen | 324/16 T |

FOREIGN PATENT DOCUMENTS 945,240  12/1963  United Kingdom ............... 324/16 T

*Primary Examiner*—Stanley T. Krawczewicz
*Attorney, Agent, or Firm*—Flynn & Frishauf

[57] ABSTRACT

To accurately determine the position of a marker on a rotating disk, for example coupled to the crankshaft of an automotive engine to determine the angular position thereof, an inductive transducer picks up the field generated by a permanent magnet located on the disk and, to compensate for amplitude variations in the output due to speed changes of the disk, and eliminate the effects of spurious side lobes generated by reversely positioned magnets, the amplitude of the output signal is normalized in an amplifier which includes a non-linear input circuit. The non-linear input circuit, preferably, is a diode-resistor network, in which the diode is forwardly poled, and a controlled current is supplied to the diode, the control being effected by the output of the amplifier in a feedback circuit, so that the output obtained from the amplifier will be uniform regardless of change in speed of the rotating body, and hence change in amplitude of the voltage induced in the inductive pick-up.

12 Claims, 5 Drawing Figures

SYSTEM TO SENSE A MARKER ON A ROTATING BODY

The present invention relates to a system to sense a marker on a rotating body, and more particularly to sense when a certain marker secured to a disk rotating with the crankshaft of an internal combustion engine passes a fixed datum position at which a sensing element is located.

Increasing demands are made on internal combustion engines to increase their efficiency and to decrease noxious exhausts. Accuracy is determining the ignition instant, the timing fuel injection and other parameters require accurate sensing of a certain position of the crankshaft of the engine. The speed of the internal combustion engine is a particularly important parameter regarding ignition timing; besides speed, however, it is important that the precise time of occurrence of a certain crankshaft position can be sensed so that the engine operating characteristics can be suitably considered when calculating the proper ignition instant for a given speed.

It has been proposed to provide an inductive sensor in order to sense the speed. The output of such a pulse source derived from an inductive sensor has an amplitude which is highly dependent on speed itself. The different amplitudes obtained with such sensors with different speeds result also in different slopes of the output waves obtained; the zero-passage of the output voltage wave differs, and thus, if the signal voltage is scanned by means of a threshold switch, the pulse duration of the output obtained from the threshold switch will depend on the speed itself.

It is possible optimally determine the ignition instant by suitable computation; such computations require, however, that the sensing pulses, on which they are based, accurately reflect the operation of the engine, that is, are accurately synchronized with respect thereto over the entire operating speed range thereof.

It is an object of the present invention to provide a system which is capable of recognizing the position of a marker on a rotating body, typically a disk connected to the crankshaft of an internal combustion engine, and which provides an output which will be the same and will have equal accuracy regardless of the speed with which the disk is driven, that is, over the wide operating ranges of an automotive internal combustion engine.

SUBJECT MATTER OF THE PRESENT INVENTION

Briefly, the marker is made of permanent magnet material; an inductive sensor is provided sensing the presence of the marker; and an amplitude control stage is connected to a pulse source formed by the inductive sensor.

The output signal derived from the system then will be amplitude-controlled; amplitude control of the output signal of the pulse source has the advantage that the output signal will be essentially uniform over the entire speed range of the engine. If this signal then is connected to a threshold circuit, then its output signal will have a uniform on-off ratio. The exact position of the marker can thus be determined more easily than by averaging of the threshold output signals and using the induced voltage directly derived from an inductive pick-up.

If more than one marker is to be sensed, then the permanent magnets at the transducer may be placed with reversed magnetic polarity. Thus, for example, the beginning and the end of an angular range can be easily determined. Amplitude control is particularly desirable in this instance; sensing of magnetic markers results in outputs which include, besides the desired marker output, also interference outputs. If the ratio of the output derived from the interfering, or noise signal to the actually desired signal is substantial, then the situation may arise that the noise signal at high speeds will fall within the amplitude range of the desired signal at low speed. Ambiguity regarding the exact angular position sensed by the marker may thus result.

In accordance with a feature of the invention, the amplitude control system includes an amplitude control stage which has a network including a diode-resistance combination, an amplifier, and a rectifier. The non-linear resistance characteristic of the diode is then used as a control characteristic for the amplitude. This is particularly important if the amplitude control stage uses the diode-resistance combination as its input. The resistance then may provide the input resistor for the amplitude control stage and the signal applied to the amplifier is taken across the diode. The diode is connected in conductive direction.

The non-linear resistance characteristics of the diode can be optimally used if a control current is applied to the diode. Amplitude control thus can be particularly easily effected.

The invention will be described by way of example with reference to the accompanying drawings, wherein.

Figure 1:
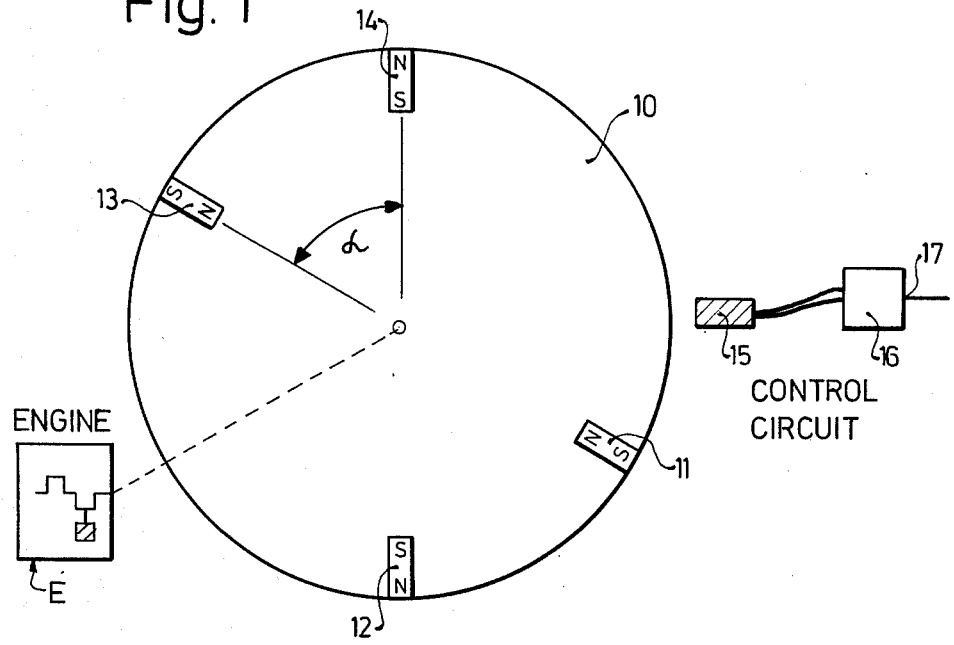
FIG. 1 is a schematic diagram of a disk having markers applied thereto, and a fixed inductive pick-up.

A disk 10 (FIG. 1) is connected to the crankshaft of an internal combustion engine E. Two pairs of markers 11-12 and 13-14 are located on the periphery of the disk. The markers of a pair are separated from each other by a predetermined angle $a$; they are oppositely poled at the circumference with respect to each other. An inductive transducer 15 is located on the frame of the vehicle and fixed in position with respect to disk 10. It is connected to an amplitude control circuit 16, the output 17 of which provides the desired signal independent of speed of rotation of the disk 1.

Figure 2:
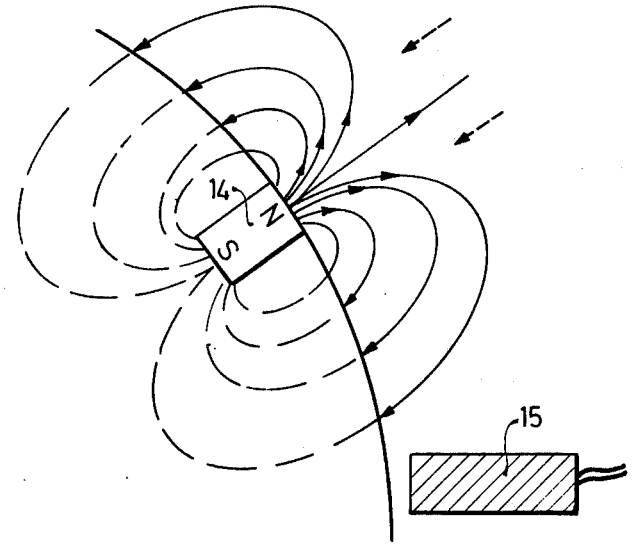
FIG. 2 is a schematic illustration of the field resulting from a magnet placed on the disk.
Figure 3:
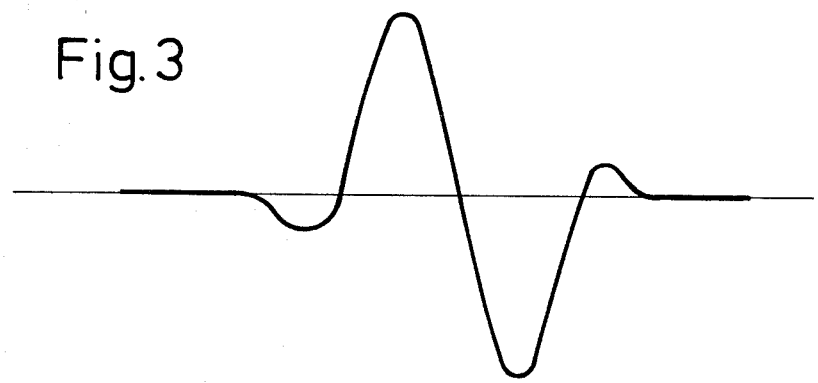
FIG. 3 is a schematic graph of the output signal obtained from a inductive pick-up placed in proximity to the magnets of the disk of FIG. 1.

The flux relationships and the resulting signals can best be explained by considering FIGS. 2 and 3. FIG. 2 shows the magnetic flux at the marker 14 directly outwardly with respect to the circumference of disk 10, and the field outside the main field is directed reverse to the main field. This field distribution results in an output signal at the inductive pulse transducer which is illustrated in FIG. 3. The main signal, which is indicated in the center portion of FIG. 3, has two additional side lobes of small amplitude joined thereto, which side lobes result in interference or noise signals.

In accordance with the present invention, the amplitude control circuit 16 is provided which dyamically controls the output signal so that the signal derived at terminal 17 will have the same amplitude value regardless of speed, so that at high speed the amplitude of the side lobes or interference or noise lobes will not approach the amplitude of the main signal at low speed.

Figure 4:
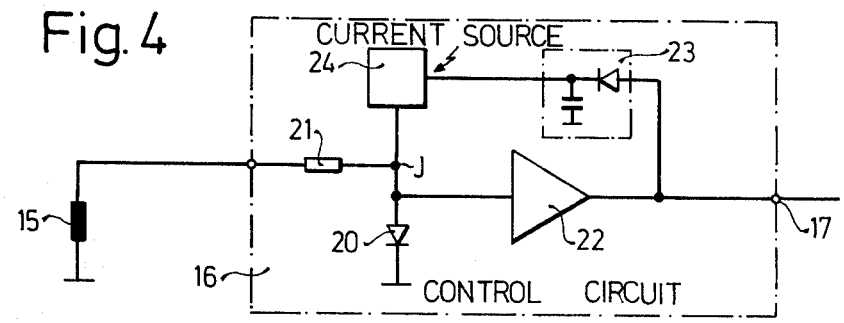
FIG. 4 is a general circuit diagram of the system including the amplitude control circuitry.

FIG. 4 is a block circuit diagram of the amplitude control curcuit 16. Pulse transducer 15 is connected in parallel to a diode-resistance circuit formed of resistor 21 and diode 20. The junction J of the diode 20 and resistor 21 is connected to an amplifier 22, the output of which is connected to the output terminal 17 of the control circuit. A feedback circuit 23, which includes a rectifier and a capacitor, is connected to a current source 24 which provides current to the diode 20 to bias the diode; the diode is connected in conductive polarity. The resistor 21 is a protective resistor for the diode 20 to limit the current through the forwardly polarized diode 20 due to the input voltage.

Usually, the voltage drop across the diode 20 will, at the most, be 0.7 V. The operating point of the diode is determined by controlling the current from the current source 24 so that the signal applied to the diode can be controlled.

Basic Operation: The circuit is so arranged that the amplitude at the junction J will always be less than the threshold voltage of the diode 20, so that the diode 20 will not operate as a cut-off, or clipper diode. The resistor 21, together with diode 20, forms a voltage divider in which the diode 20 is a variable resistor. If the output voltage of the pick-up transducer 15 increases, for example due to increased speed of the engine, and hence of disk 10 (FIG. 1), the input voltage to resistor 21, and hence the output amplitude of amplifier 22 will increase. Due to the peak rectifying effect of the diode 23, connected in conductive direction, the capacitor will be charged to a higher value, thus controlling the current source 24 to supply a higher current to junction J. This increase current reduces the dynamic resistance of diode 20 in accordance with the well known current-resistance characteristic of diodes connected in forward or conductive direction. This cause damping of the signal amplitude by the voltage divider, so that the output voltage of the amplifier 22 drops. By suitable arrangement of the amplification of amplifier 22, and of the feedback and current supply by source 24 in relation to the characteristics of diode 20, the output voltage at terminal 17 can be maintained constant regardless of rise in input voltage at the output of the transducer 15. Thus, regardless of speed, the output signal will have a uniform amplitude.

The current source 24 supplies a current of such magnitude that the diode is always conductive. The alternating amplitude of the transducer 15 is small in relation to the current supplied by the source 24. The voltage divider 21, 20, in combination with the current source 24, so shifts the operating point of the diode 20 that both half waves of the transducer amplitude 15 will fall in the conductive range of the diode 20. The amplitude of the voltage derived from transducer 15 causes increased current flow from the current source 24 at one of the half waves, and a decrease of the current flow from source 24 during the other half wave. The relative polarity of the wave of FIG. 3 (namely whether the first half wave is positive or negative, thus indicating polarity of the magnet passing transducer 15), is not affected thereby.

Figure 5:
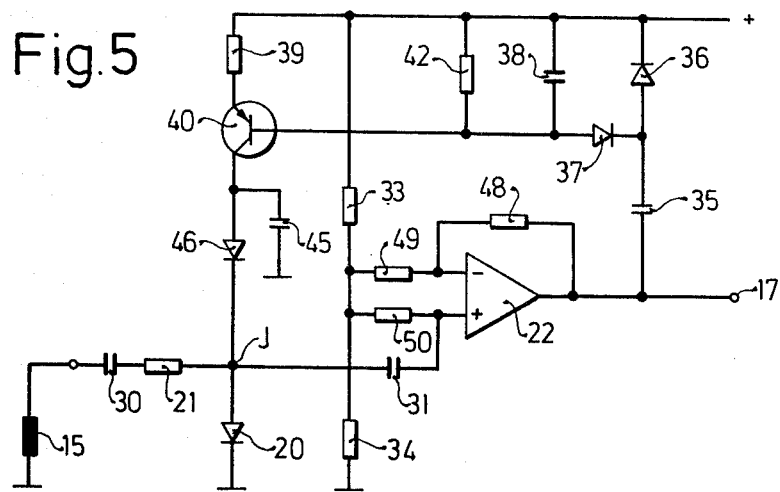
FIG. 5 is a schematic circuit diagram illustrating a specific embodiment and a circuit in greater detail.

A detailed circuit of the system of FIG. 4 is shown in FIG. 5. The transducer 15 is connected over capacitor 30 with the diode-resistor combination 20, 21. The junction J is connected through a capacitor 31 to the direct input of an operational amplifier 22'. The output of operational amplifier 22' is connected to the output terminal 17. A capacitor 35 couples the output to the current source 17 through a rectifier and filter including diodes 36, 37 and capacitor 38. The cathode of diode 36 as well as one terminal of the capacitor 38 are connected to a source of positive potential; a transistor 40 has its emitter connected through emitter-resistor 39 to the source of positive potential. It is controlled by a base connection to the diode 37 and capacitor 38. Capacitor 38 has a resistor 42 connected in parallel thereto. The collector of transistor 40 is bypassed to ground or chassis by a capacitor 45. It is connected to junction J through a diode 46, poled in conductive direction. A feedback resistor 48 connects the output of operational amplifier 22' to the inverting input, which is further connected through a resistor 49 to a voltage divider formed by resistors 33, 34 and connected between the source of positive voltage and ground or chassis, to which also the negative terminal of the voltage supply is connected. The tap or division point of the voltage divider is further connected by a resistor 50 to the direct input of operational amplifier 22'.

The operation of the circuit of FIG. 5 corresponds to that explained in connection with FIG. 4. The diode resistance combination 20, 21 is controlled both by d-c signals from transistor 40 as well as a-c signal applied through capacitor 30 and coupled out by capacitor 31, which capacitors 30, 31 provide for a-c coupling while isolating the d-c signal from current source 24, formed essentially by transistor 40 and the associated circuitry.

The amplitude control circuit requires a non-linear resistance characteristic; other circuit elements than a diode may be used, provided the element has the required resistance-current characteristic. Various other changes and modifications may be made within the scope of the inventive concept.

I claim:

1. System to sense a marker on a rotating body (10) comprising
    a permanent magnet (11-14) located on the rotatng body and forming said marker;
    an inductive transducer (15) fixedly located with respect to the rotating body and having a voltage induced therein upon rotation of the body;
    and an amplitude control circuit (16) connected to the transducer (15) and including a feedback network to normalize the amplitude of the output from said control circuit (16) to an essentially constant value independent of speed of the rotating body.

2. System according to claim 1, wherein a plurality of markers (11-14) are located on the rotating body, the markers comprising permanent magnets of alternating magnetic polarity facing the inductive transducer (15).

3. System according to claim 1, wherein the amplitude control circuit (16) comprises an essentially linear amplifier (22, 22') and a non-linear input circuit (20, 21, 24) connected to the amplifier, the output (17) of the amplifier providing the output of the system.

4. System according to claim 3, wherein the non-linear input circuit comprises a diode-resistor combination (20, 21).

5. System according to claim 3, wherein the feedback network includes a rectifier (23).

6. System according to claim 4, wherein one of the elements of the combination of the diode-resistor combination (20, 21) is connected in parallel to the input of the amplifier (22, 22').

7. System according to claim 4, further comprising means (24) to supply a current of controlled amplitude to the diode (20), said current supply means (24) being included in the feedback network and being controlled by the output of said amplifier, the diode being poled to pass said current.

8. System according to claim 7, further comprising a rectifier (23; 37, 36, 38) forming part of the feedback network from the output of the amplifier (22, 22') to the current source (24; 40, 39, 42, 45, 46).

9. System according to claim 3, wherein the non-linear input circuit comprises a voltage divider including a non-linear resistance element (20) having a variable resistance, the resistance varying in dependence on current supplied thereto;

and means (24; 40, 39, 42, 46, 45) supplying a variable current to said non-linear element (20), said means being controlled by the output of the amplifier (22, 22') to supply a current of such magnitude to flow through the non-linear element (20) that the output of the amplifier (22, 22') remains essentially constant regardless of amplitude of the output from the inductive transducer (15).

10. System according to claim 9, further comprising a rectifier circuit (23; 37, 36, 38) connected in the feedback network from the amplifier (22, 22') to the current source (24; 40, 39, 42, 46, 45) and to the non-linear element (20).

11. In an automotive engine, a system to determine the angular position of the crankshaft of the engine, comprising a disk-shaped element (10) coupled to the crankshaft, and further comprising p1 the system of claim 1
   wherein the disk-shaped element forms the rotating body (10).

12. In an automotive engine, a system to determine the angular position of the crankshaft of the engine, comprising a disk-shaped element (10) coupled to the crankshaft, and further comprising
   the system of claim 9
   wherein the disk-shaped element forms the rotating body (10) and wherein a plurality of markers (11-14) are located on the rotating body, the markers comprising permanent magnets of alternating magnetic polarity facing the inductive transducer (15).

* * * * *